United States Patent
Shon et al.

(10) Patent No.: US 7,695,831 B2
(45) Date of Patent: Apr. 13, 2010

(54) COATING COMPOSITION, AND COOKING DEVICE OR COOKING RECEPTACLE COATED WITH THE SAME

(75) Inventors: Jong Chull Shon, Suwon-si (KR); Hyang Ki Kim, Suwon-si (KR); Ki Suk Jeon, Seongnam-si (KR); Tae Woo Kim, Suwon-si (KR); Jae Man Joo, Suwon-si (KR); Seok Weon Hong, Yongin-si (KR); Jong Hak Hyun, Seoul (KR); Jae Jong Oh, Yeonsu-gu (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 12/230,939

(22) Filed: Sep. 8, 2008

(65) Prior Publication Data

US 2009/0311514 A1 Dec. 17, 2009

(30) Foreign Application Priority Data

Jun. 16, 2008 (KR) ...................... 10-2008-0056393

(51) Int. Cl.
*B32B 9/00* (2006.01)
*B32B 17/06* (2006.01)
*C03C 3/062* (2006.01)

(52) U.S. Cl. ...................... 428/701; 428/432; 428/433; 428/457; 428/469; 501/11; 501/14; 501/15; 501/17; 501/21; 501/24

(58) Field of Classification Search ................. 428/423, 428/433, 457, 469; 501/11, 14, 15, 17, 21, 501/24

See application file for complete search history.

(56) References Cited

U.S. PATENT DOCUMENTS

| 3,547,098 A | 12/1970 | Lee |
| 4,520,115 A * | 5/1985 | Speit et al. ..................... 501/60 |
| 2003/0064874 A1 | 4/2003 | Eckmann et al. |

FOREIGN PATENT DOCUMENTS

GB  1428880  3/1976

OTHER PUBLICATIONS

European Search Report for corresponding European Patent Application No. 08165603.5 dated Oct. 1, 2009, 4 pgs (in English).

* cited by examiner

*Primary Examiner*—Gwendolyn Blackwell

(57) ABSTRACT

A coating composition and a cooking device and/or cooking receptacle coated with the coating composition are described. The coating composition includes 10 to 30 wt. % of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$, and an adhesion enhancer. The coating composition provides favorable thermal resistance, acid resistance and mechanical properties, such that a cooking device and/or receptacle coated with the coating composition may be easily cleaned at a relatively low temperature.

19 Claims, 5 Drawing Sheets

COATING COMPOSITION, AND COOKING DEVICE OR COOKING RECEPTACLE COATED WITH THE SAME

CROSS-REFERENCE TO RELATED APPLICATIONS

This application claims the benefit of Korean Patent Application No. 2008-0056393, filed on Jun. 16, 2008 in the Korean Intellectual Property Office, the disclosure of which is incorporated herein by reference.

BACKGROUND

1. Field

One or more embodiments of the present invention relate to a coating composition, and a cooking device and/or a cooking receptacle coated with the same, and, more particularly, to a coating composition with favorable thermal resistance, acid resistance, mechanical strength and washability, as well as a cooking device and/or a receptacle coated with the same.

2. Description of the Related Art

Enamel is a coating formed by applying vitreous glazes to a surface of a metal. The enamel has combined properties including the toughness of a metal ingredient and the corrosion resistance and cleanliness of a glass ingredient and, therefore, is widely used in cooking devices and/or cooking receptacles.

Among coating materials used in the manufacture of cooking devices and/or cooking receptacles, Teflon materials such as polytetrafluorethylene (PTFE) are frequently used. Teflon has low surface energy and is typically only slightly smeared by water or oil contained in foods and, thus, exhibits excellent washability. However, this material has disadvantages such as: low thermal resistance that may cause difficulty in using the material at temperatures exceeding 250 degrees C.; low mechanical strength, which in turn, requires careful washing thereof; and decreased adhesion properties of a coating surface if repeatedly used.

In order to remove waste adhered to the coating surface, a catalytic enamel comprising $SiO_2$, $Na_2O$ and $MnO_2$ has been developed. This material is based on a principle that oils and/or impurities are absorbed into microfine pores of the catalytic enamel. Thus, the catalytic enamel must have the microfine pores to receive such impurities. The microfine pores of the catalytic enamel may lead to problems in that the catalytic enamel has an uneven surface, small surface strength and/or low abrasion resistance, may be easily released from a metal body to which the catalytic enamel is coated by external impact, and may adversely affect health since the impurities are accumulated in the microfine pores after long periods of use.

Conventional glazes show favorable adhesiveness to an oily surface, a polished surface and/or a layer to be coated with the glazes but disadvantageously exhibit poor thermal resistance. In particular, when continuously used at a temperature of at least 450° C., the enamel may encounter serious problems including, for example, cracks, scumming, loss of a glaze layer in the enamel, etc.

In recent years, therefore, pyrolytic enamels have been used to coat inner frames, a fan and/or a door of an oven, in particular, among different cooking devices, so as to achieve improved washability of the oven. The pyrolytic enamel may provide sufficient heat to the oven during cleaning thereof so as to burn and remove waste, in particular, oily waste adhered to an inner surface of the oven. Therefore, pyrolytic enamel typically has moderate thermal resistance sufficient to withstand high temperatures in the range of 450 to 500° C., at which waste, in particular oily waste, can be completely combusted. However, using the pyrolytic enamel, all parts of an oven structure (including a heat insulation material for the oven) must endure high temperature conditions. Also, even if the oven temperature is raised to the range of 450 to 500° C., the entire oven does not typically reach the temperature in the range of 450 to 500° C. Especially at corners and/or at other portions near the door the temperature does not reach the temperature range of 450 to 500 and, therefore, the waste still remains thereon. In order to solve this problem, it may be proposed to continuously maintain the temperature of the entire oven at 500° C. or more so that the temperature of the corner parts and/or the portions near the door part can be increased to the range of 450 to 500° C. However, this approach causes a problem in that other parts of the oven may malfunction or suffer damage due to the high temperature.

TABLE 1 constitutional compositions of conventional enamels

| Components | Normal enamel (wt. %) | Catalytic enamel (wt. %) | Pyrolytic enamel (wt. %) |
|---|---|---|---|
| $SiO_2$ | 30~60 | 10~60 | 10~60 |
| $Na_2O$ | 5~20 | 0~20 | 0~20 |
| $K_2O$ | 0~20 | 0~20 | 0~20 |
| CaO | 0~10 | 0~10 | 0~5 |
| BaO | 0~10 | 0~10 | 0~5 |
| MgO | | | 0~5 |
| $B_2O_3$ | | 0~20 | 0~20 |
| $Al_2O_3$ | 0~10 | | 0~5 |
| $TiO_2$ | 0~20 | | 0~10 |
| $P_2O_5$ | 0~10 | 0~10 | 0~5 |
| $Li_2O$ | 0~10 | 0~10 | 0~10 |
| $Sb_2O_3$ | | 0~20 | |
| ZnO | 0~5 | 0~20 | 0~5 |
| $ZrO_2$ | 0~5 | | 0~5 |
| $Co_2O_3$ | 0~3 | | 0~3 |
| NiO | 0~3 | | 0~3 |
| $MnO_2$ | 0~2 | 0~50 | 0~2 |
| CuO | 0~2 | | 0~2 |

SUMMARY

In order to overcome the problems described above due to limitations and disadvantages of the related art, one or more embodiments of the present invention are directed to a coating composition with favorable thermal resistance, acid resistance and mechanical strength, as well as an advantage that a cooking device and/or cooking receptacle coated with the coating composition are easily washable at relatively low temperatures.

Additional aspects and/or advantages will be set forth in part in the description which follows and, in part, will be apparent from the description, or may be learned by practice of the invention.

Therefore, in order to achieve the above purposes of the present invention, it is an aspect of the invention to provide a coating composition comprising 10 to 30% by weight ("wt. %") of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$ and an adhesion enhancer.

In some embodiments, the coating composition preferably includes $SiO_2$, $P_2O_5$ and $Al_2O_3$ together to form a spherical structure in an inorganic vitreous material (that is, frit).

The adhesion enhancer contained in the coating material may include at least one selected from $Co_2O_3$, NiO and CuO.

The coating composition may further include 1 to 5 wt. % of CaO as a stabilizing agent.

In accordance with another aspect of the invention, there is provided a cooking device which includes a main body with a cooking part, and a coating layer applied to the cooking part, wherein the coating layer is formed of a coating composition, comprising 10 to 30 wt. % of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$ and an adhesion enhancer.

The coating composition used in the cooking device may include $SiO_2$, $P_2O_5$ and $Al_2O_3$ together to form a spherical structure in a frit.

The adhesion enhancer contained in the coating composition may include at least one selected from $Co_2O_3$, NiO and CuO.

The coating composition may further include 1 to 5 wt. % of CaO as a stabilizing agent.

The cooking part in the cooking device of embodiments of the present invention may include inner walls and/or an upper side of the cooking device, which face or are exposed to foods, and may be made of metal or metallic materials.

In accordance with yet another aspect of the invention, there is provided a cooking receptacle which includes a main body and a coating layer entirely or partially applied to the main body, wherein the coating layer is formed of a coating composition, including 10 to 30 wt. % of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$ and an adhesion enhancer.

The coating composition used in the cooking receptacle may include $SiO_2$, $P_2O_5$ and $Al_2O_3$ together to form a spherical structure in a frit.

The adhesion enhancer contained in the coating composition may include at least one selected from $Co_2O_3$, NiO and CuO.

The coating composition may further include 1 to 5 wt. % of CaO as a stabilizing agent.

As is apparent from the preceding description, embodiments of the present invention provide a coating composition with favorable thermal resistance, acid resistance and mechanical strength, as well as an advantage that a cooking device and/or cooking receptacle coated with the coating composition is easily cleaned at a relatively low temperature.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
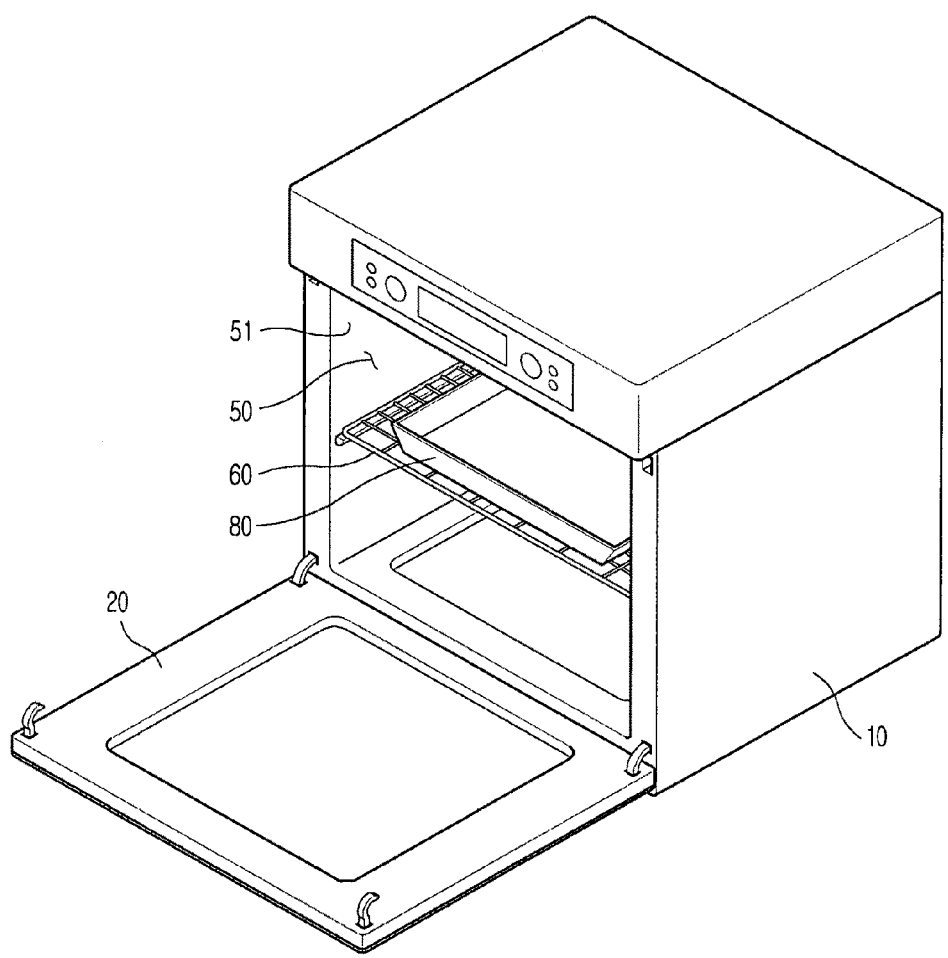
FIG. 1 is a perspective view illustrating a cooking device, according to an embodiment of the present invention.

Reference will now be made in detail to embodiments of the present invention, examples of which are illustrated in the accompanying drawings, wherein like reference numerals refer to like elements throughout. Embodiments are described below to explain the present invention by referring to the figures.

A coating composition of the present invention includes 10 to 30 wt. % of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$ and an adhesion enhancer.

The coating composition according to the present invention may be characterized by a spherical structure (e.g., a molecular combination including $SiO_2$, $P_2O_5$ and $Al_2O_3$) combined with a frit in an enamel coated surface, in which oxygen leads to an optimal oxidation of waste on all sides and an upper surface of a cooking device. The spherical structure has a large surface area and retains minimal residue, thus improving performance and durability of the cooking device. The frit has a surface layer to store oxygen effective to oxidize the waste when a cooking device or cooking receptacle is heated. In particular, oxygen reacts with water on the surface layer so as to push the waste out of the surface layer.

Conventional enamels provide limited oxygen bonding on the surface layer since they have a normal molecular combination including $SiO_2$, $P_2O_5$ and $Al_2O_3$ as primary ingredients of a frit.

For the coating composition of embodiments of the present invention, the surface layer includes a vitreous inter-molecular combination having spherical molecular cavities in which oxygen is trapped, and is in a specific molecular bonded state to prevent penetration of waste while permitting oxygen permeation. Accordingly, a cooking device and/or cooking receptacle coated with the coating composition of embodiments of the present invention is easily cleaned and does not exhibit reduced durability even after it is used many times.

Silicon dioxide, $SiO_2$, has superior acid resistance sufficient not to react with acidic or alkaline solutions. Also, $SiO_2$ can endure high temperature conditions and shows extremely small expansion coefficients at high temperatures, which in turn results in excellent tolerance to rapid temperature change.

The coating composition of the present invention includes $SiO_2$ in the amount of 10 to 30 wt. %, which is smaller than those of normal, catalytic and pyrolytic enamels, as shown in TABLE 1. Unlike conventional enamels, the coating composition of embodiments of the present invention has reduced $SiO_2$ content but additionally includes $Al_2O_3$ to enhance acid resistance thereof.

$P_2O_5$ containing double-bonded oxygen atoms shows insufficient chemical durability and strong volatility. Thus, $P_2O_5$ has a spherical structure (a molecular combination including $SiO_2$, $P_2O_5$ and $Al_2O_3$) and serves to inhibit adhesion of waste to a coating layer. Alternatively, $P_2O_5$ can form a phosphate coating film including any one selected from zinc phosphate, manganese phosphate and/or iron phosphate over a metal surface so as to prevent rust and improve adhesiveness of paint applied to the metal surface.

Unlike conventional enamels including normal, catalytic and/or pyrolytic enamels, the coating composition of the present invention may include manganese phosphates. Manganese phosphates are used to produce a fine coating film consisting of microfine particles and/or a thick coating film, thereby improving wear resistance. That is, formation of a phosphate salt based coating film on a metal surface results in improved chemical properties including rust resistance, corrosion resistance, high temperature oxidation resistance, etc., as well as excellent hardness and mechanical strength.

It is generally known that $Al_2O_3$ influences chemical durability and mechanical properties of a complete enamel layer. As described above, the coating composition of the present invention includes 10 to 30 wt. % of $Al_2O_3$ in order to improve acid resistance while reducing $SiO_2$ content, compared to conventional enamels. In addition, $Al_2O_3$ used in the present invention has a spherical structure (a molecular combination including $SiO_2$, $P_2O_5$ and $Al_2O_3$) and functions to inhibit waste such as food waste generated during a cooking process from being adhered to a coating layer.

Zirconia, $ZrO_2$, is well known as a thermal resistant material with a high melting point (about 2,700° C.), which also has low thermal conductivity, chemical resistance and stability in a wide pH range from acidic to alkaline regions and other material properties including, for example, low thermal expansion, excellent friction resistance such as high strength and high hardness (Mohs hardness more than 7.0). In order to produce a sintered form of $ZrO_2$, CaO is typically added as a stabilizing agent to form a tetragonal or cubic structure which is stable at ordinary temperatures so that the sintered $ZrO_2$ does not undergo transformation during a cooling process, thereby avoiding cracking.

Titanium oxide, $TiO_2$, is not corroded by inorganic or organic acids, alkaline materials, gases and the like at high temperatures and is not molten at less than 1800° C.

In order to improve adhesiveness between a coating layer and a cooking device or cooking receptacle, the cooking device or cooking receptacle may have high surface roughness, or include at least one selected from a group consisting of $Co_2O_3$, NiO and CuO as an adhesion enhancer. In addition to $Co_2O_3$ which is well known as an adhesion enhancer, the present invention may also use NiO and/or CuO to improve adhesion properties of the coating composition.

One or more embodiments of the present invention provide a cooking device including a main body with a cooking part and a coating layer applied to the cooking part, wherein the cooking part includes inner walls and/or an upper side of the cooking device that face or are exposed to foods and are made of metal materials.

One or more embodiments of the present invention also provide a cooking receptacle including a main body and a coating layer entirely or partially applied to the main body, wherein the coating layer is formed of a coating composition and the main body is made of metal materials.

The cooking device or cooking receptacle may include household cooking ranges such as a gas range, an electric range, a microwave range, a gas oven, a microwave oven, inner sides of a grill case, a grill fan, a tray, etc.

The cooking device or cooking receptacle to be coated is typically based on metal materials, which may include surface coated steels such as phosphate coated steels or zinc phosphate coated steels, stainless steels, hot dip aluminized steels, hot dip aluminized-galvanized steels, decarburized steels and so on.

Hereinafter, referring to FIG. 1, a description will be given of an oven as an illustrative example of the cooking device according to one or more embodiments of the present invention.

The cooking device may include, for example, a main body 10, a cooking part 50 to form a space in which foods are cooked, a door 20 of the cooking part 50, a control part to control the cooking device (not shown) and a heater (not shown).

The cooking part 50 is formed in the main body 10 and has inner walls 51 to form a space where foods are cooked. The inner walls 51, which have a coating layer including the coating composition, are exposed to foods during cooking.

The cooking part 50 may include a tray 80 to receive foods. The tray 80 is detachably mounted on a rack 60 to guide and support the tray 80. The rack 60 is installed in the cooking part 50 and may directly receive foods thereon. Thus, the tray 80 and the rack 60 are illustrative of the cooking receptacle, which may have a coating layer.

The main body 10 has a door 20 hinged at a front side thereof to open and close the main body.

The main body may further include a water supply device (not shown) to provide water or steam to clean the inner area of the cooking part 50 after completion of the cooking.

The water supply device may include a water storage part, a pump to deliver the water from the water storage part to the cooking part, and an injection nozzle to spray the water to the inner walls of the cooking part. Alternatively, the water supply device may comprise a water storage part, a heater to heat the water from the water storage part and generate steam, and an injection nozzle to spray the steam to the inner walls of the cooking part.

Next, a description will be given of a procedure to clean the cooking device.

In order to remove waste (firmly) attached to the inner walls 51 of the cooking device, after the cooking device is heated to 200 to 300° C., then, the water supply device injects water or steam to the inner walls. If the cooking device is heated, the spherical structure (a molecular combination including $SiO_2$, $P_2O_5$ and $Al_2O_3$) combined with the frit contained in the coating layer holds oxygen, which in turn, oxidizes the waste. The water or steam injected by the water supply device reacts with oxygen and pushes the waste out of the inner walls, such that the waste can be easily released from the inner walls.

The waste firmly attached to the tray 80 or the rack 60 can be removed by the procedure described above as well as by general washing methods.

Figure 2:
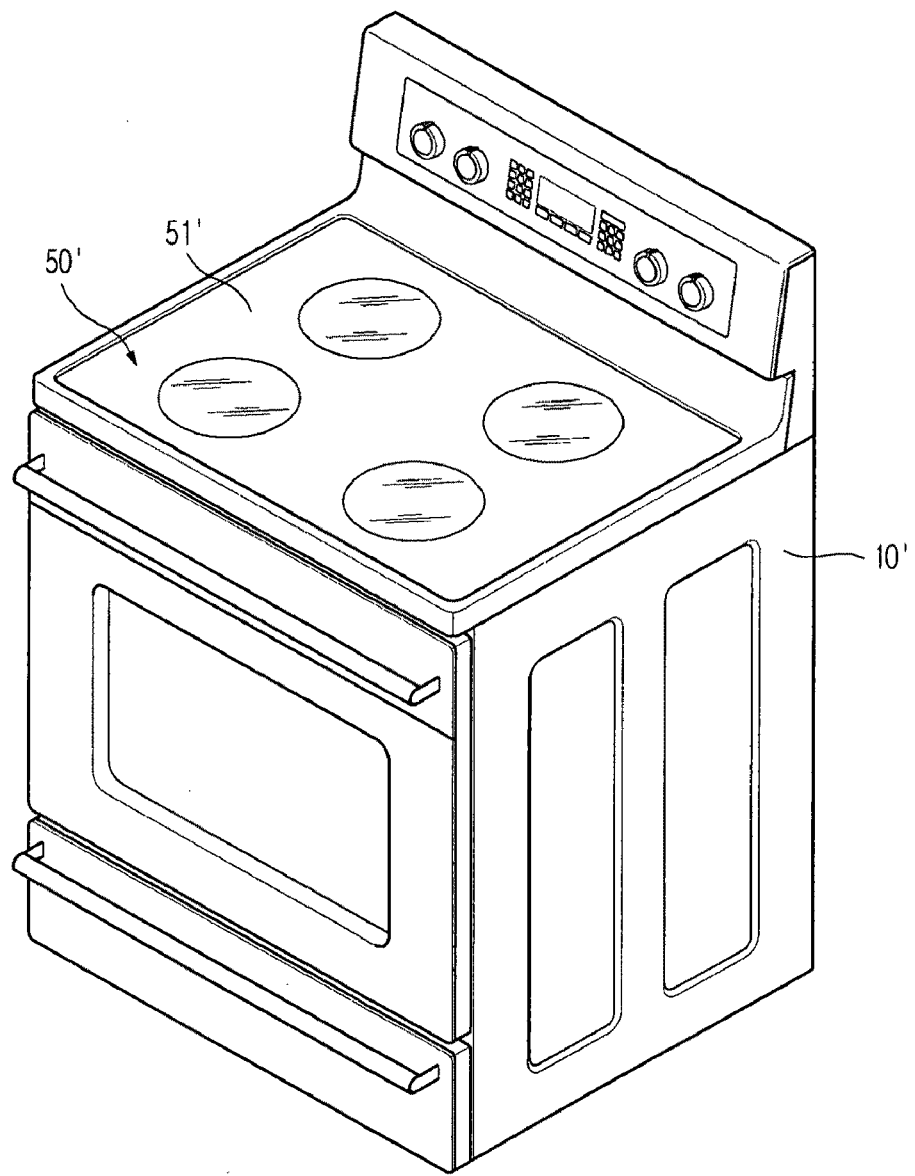
FIG. 2 is a perspective view illustrating a cooking device, according to another embodiment of the present invention.

FIG. 2 shows an electric range illustrative of the cooking device, according to the present invention.

The cooking device may include, for example, a main body 10', a cooking part 50' to form a space in which foods are cooked, a control part to control the cooking device (not shown) and a heater (not shown).

The cooking part 50' is formed on an upper portion of the main body 10' and has a top surface 51' exposed to the foods during cooking. The top surface 51' has a coating layer including the coating composition.

The cooking device is cleaned using residual heat after cooking and heating the foods. After completion of the food heating, water is injected into the top surface 51' of the cooking part 50'. During food heating, the spherical structure (a molecular combination including $SiO_2$, $P_2O_5$ and $Al_2O_3$) combined with the frit contained in the coating layer holds oxygen, which in turn, oxidizes the waste. The water or steam injected by the water supply device reacts with oxygen and pushes the waste out of the inner walls, such that the waste can be easily released from the inner walls.

The inorganic coating (enamel) composition is applied to a surface of a metal sheet, preferably, a decarburized steel sheet, followed by firing and fixing (or enameling) to obtain an enamel material. The enamel material is then melting processed by adding BaO or $TiO_2$ to a frit including $SiO_2$, $Na_2O$, $K_2O$, $P_2O_5$, $ZrO_2$ and alumina and melting the mixture in a typical melting furnace according to conventional methods. The molten material is fed into cold water to quench the material such that the material is changed into powdery particles having a particle size of 16 μm, as an enameling material.

An electrostatic powder coating type enameling process may include high pressure injection of the enameling material to a metal and drying the treated metal in an enameling furnace at 800° C. or more, so as to produce an enamel coated product with excellent adhesion to the metal.

EXAMPLE 1

Oven trays lined with a catalytic enamel, a pyrolytic enamel and a coating composition of embodiments of the present invention were each prepared. After application of a test material containing soy sauce, ketchup, egg, lemon juice, milk, meat extract and shortening to each of the oven trays, the oven tray was heated at 250° C. for 60 minutes. Next, the temperature was decreased to room temperature to cool the oven tray. The oven trays lined with the catalytic enamel, the pyrolytic enamel and the coating composition of embodiments of the present invention, upon which the test materials had been burned, were placed and heated in ovens. After steam injection, each of the oven trays was subjected to determination of a temperature at which the test material was removed from the oven tray. In order to determine a coating service life of the oven tray, the above procedure was repeated 50 times. The results are shown in TABLE 2.

TABLE 2

| Type | Catalytic enamel | Pyrolytic enamel | Coating composition of embodiments of the present invention |
|---|---|---|---|
| Heating temperature | 210° C. | 480~500° C. | 200~300° C. |
| Energy consumption index | 100 | 300 | 100 |
| Coating service life | Wash cycle of Maximum 25 times | Unlimited | Unlimited |

As shown in TABLE 2, the waste was easily removed by steam injection at 210° C. or more for the catalytic enamel, as well as at 480 to 500° C. or more for the pyrolytic enamel. As to the coating composition of embodiments of the present invention, the waste was easily removed at 200 to 300° C. or more.

With regard to the coating service life, it was observed that the catalytic enamel was partially released from the oven tray after the wash cycle was repeated 25 times or more.

Accordingly, it is understood that heating the oven tray lined with the coating composition of embodiments of the present invention to a relatively low temperature of 200 to 300° C., then, using water or steam easily removes waste from the oven tray, compared to the oven tray lined with the pyrolytic enamel. The service life of the coating composition of embodiments of the present invention is also superior to that of the catalytic enamel.

EXAMPLE 2

Figure 3:
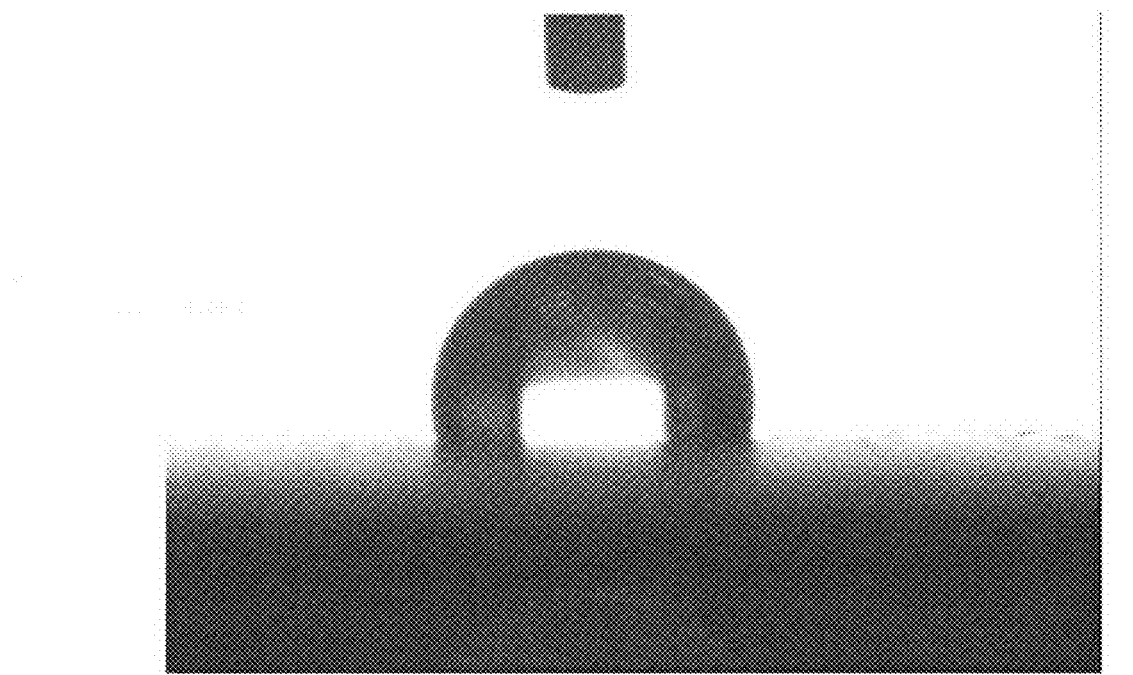
FIG. 3 shows a contact angle of a water drop on a metal surface having a Teflon coating layer.
Figure 4:
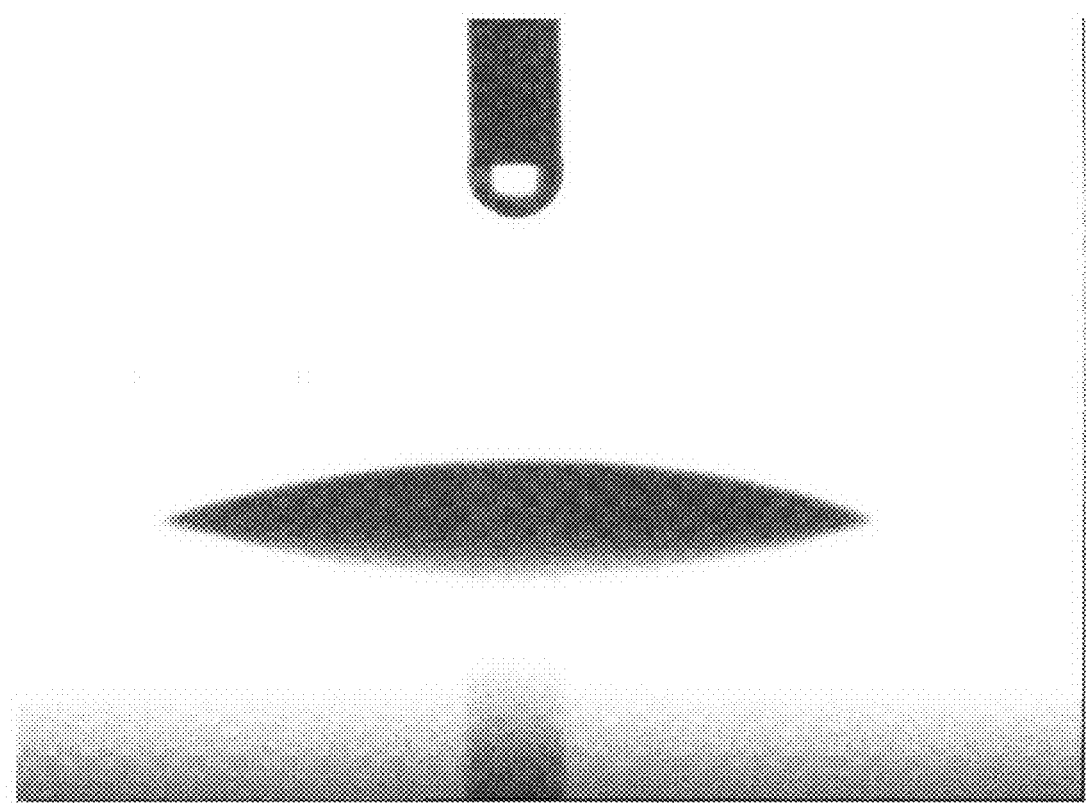
FIG. 4 shows a contact angle of a water drop on a metal surface having a normal enamel coating layer.
Figure 5:
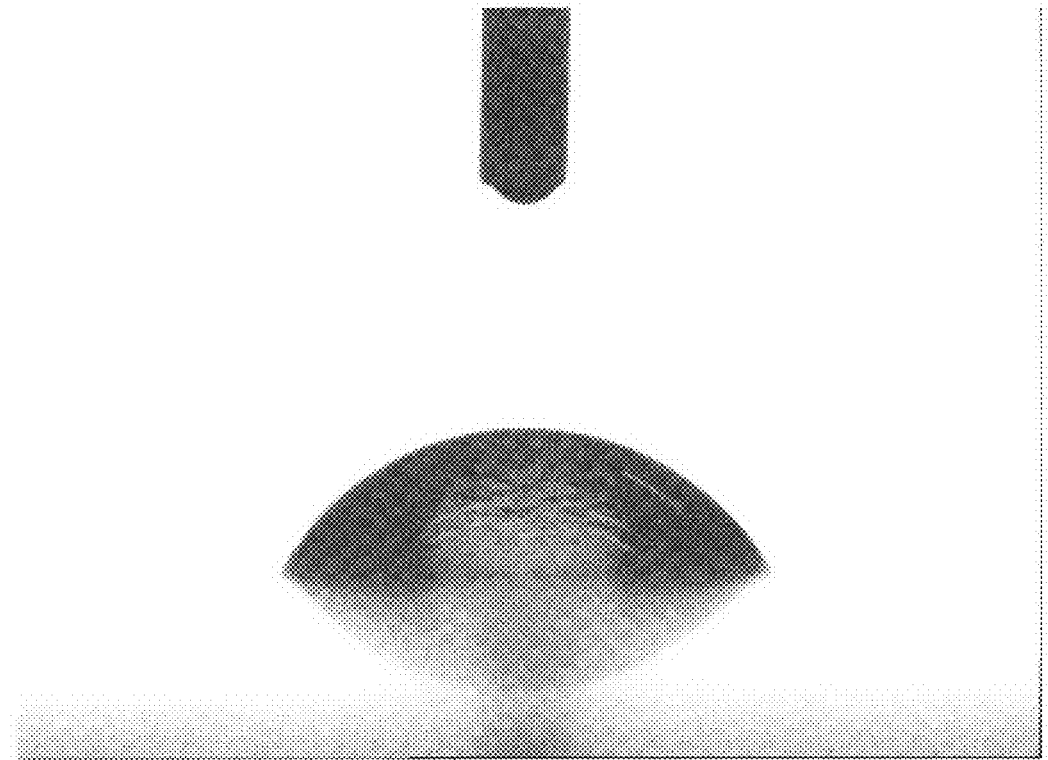
FIG. 5 shows a contact angle of a water drop on a metal surface having a coating layer formed according to embodiments of the present invention.

Metal surfaces were each coated with a normal enamel, a Teflon coating and a coating composition of embodiments of the present invention. Each of the metal surfaces having the coating layers was subjected to determination of a pencil hardness and measurement of a contact angle of a water drop thereon. The results are shown in TABLE 3. The measured contact angles are shown in FIGS. 3 to 5.

"Pencil hardness" is measured by performing a pencil hardness test upon a material 5 times, if the pencil causes no material defects such as scratches, the material is said to have a hardness corresponding to the type of pencil used. For example, when a material is subjected to the pencil harness test 5 times using a 5H pencil and the test does not cause any defects (or abnormal appearance) in the material, the pencil hardness of the material is said to be at least 5H.

The contact angle of a water drop on the metal surface having the coating layer is an indication of the washability of the metal surface. The greater the contact angle, the more easily the metal surface is washed.

TABLE 3

| | Pencil hardness | Contact angle (°) |
|---|---|---|
| Teflon coating | B | 110 |
| | 1B | 109 |
| | B | 108 |
| Normal enamel | 6H | 22 |
| | 6H | 21 |
| | 6H | 20 |
| Coating composition of embodiments of the present invention | 6H | 72 |
| | 6H | 70 |
| | 6H | 72 |
| | 6H | 71 |

As shown in TABLE 3, the coating composition of embodiments of the present invention has high hardness and a greater contact angle, therefore, exhibits improved washability as well as excellent mechanical properties.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A coating composition comprising:
   10 to 30 wt. % of SiO2, 10 to 30 wt. % of P2O5, 10 to 30 wt. % of Al2O3, 1 to 20 wt. % of TiO2, 7 to 15 wt. % of Na2O, 7 to 15 wt. % of K2O, 5 to 10 wt. % of ZrO2, 2 to 5 wt. % of BaO, 2 to 5 wt. % of B2O3, 1 to 2 wt. % of MnO2 and an adhesion enhancer.

2. The coating composition according to claim 1, wherein SiO2, P2O5 and Al2O3 together form a spherical structure in a frit.

3. The coating composition according to claim 1, wherein the adhesion enhancer is at least one selected from a group consisting of Co2O3, NiO and CuO.

4. The coating composition according to claim 1, further comprising 1 to 5 wt. % of CaO as a stabilizing agent.

5. A cooking device comprising:
   a main body with a cooking part; and
   a coating layer applied to the cooking part, wherein the coating layer is formed of a coating composition comprising 10 to 30 wt. % of SiO2, 10 to 30 wt. % of P2O5, 10 to 30 wt. % of Al2O3, 1 to 20 wt. % of TiO2, 7 to 15 wt. % of Na2O, 7 to 15 wt. % of K2O, 5 to 10 wt. % of ZrO2, 2 to 5 wt. % of BaO, 2 to 5 wt. % of B2O3, 1 to 2 wt. % of MnO2 and an adhesion enhancer.

6. The cooking device according to claim 5, wherein SiO2, P2O5 and Al2O3 together form a spherical structure in a frit.

7. The cooking device according to claim 5, wherein the adhesion enhancer is at least one selected from a group consisting of Co2O3, NiO and CuO.

8. The cooking device according to claim 5, wherein the coating composition further includes 1 to 5 wt. % of CaO as a stabilizing agent.

9. The cooking device according to claim 5, wherein the cooking part is formed in the main body and the coating layer is applied to inner walls of the cooking part.

10. The cooking device according to claim 5, wherein the cooking part is formed on an upper portion of the main body and the coating layer is applied to a top surface of the cooking part.

11. The cooking device according to claim 5, wherein the cooking part is made of a metal.

12. The cooking device according to claim 9, wherein the cooking part is made of a metal.

13. The cooking device according to claim 10, wherein the cooking part is made of a metal.

14. A cooking receptacle comprising:
a main body; and
a coating layer applied to at least a part of the main body, wherein the coating layer is formed of a coating composition comprising 10 to 30 wt. % of $SiO_2$, 10 to 30 wt. % of $P_2O_5$, 10 to 30 wt. % of $Al_2O_3$, 1 to 20 wt. % of $TiO_2$, 7 to 15 wt. % of $Na_2O$, 7 to 15 wt. % of $K_2O$, 5 to 10 wt. % of $ZrO_2$, 2 to 5 wt. % of BaO, 2 to 5 wt. % of $B_2O_3$, 1 to 2 wt. % of $MnO_2$ and an adhesion enhancer.

15. The cooking receptacle according to claim 14, wherein $SiO_2$, $P_2O_5$ and $Al_2O_3$ together form a spherical structure in a frit.

16. The cooking receptacle according to claim 14, wherein the adhesion enhancer is at least one selected from a group consisting of $Co_2O_3$, NiO and CuO.

17. The cooking receptacle according to claim 14, wherein the coating composition further includes 1 to 5 wt. % of CaO as a stabilizing agent.

18. The cooking receptacle according to claim 14, wherein the cooking receptacle is made of a metal.

19. A coating composition comprising:
10 to 29 wt. % of $SiO_2$, 11 to 30 wt. % of $P_2O_5$, 11 to 30 wt. % of $Al_2O_3$, at least 1 wt. % of $TiO_2$, at least 1 wt. % of $Na_2O$, at least 1 wt. % of $K_2O$, at least 1 wt. % of $ZrO_2$, at least 1 wt. % of BaO, at least 1 wt. % of $B_2O_3$, at least 1 wt. % of $MnO_2$, and an adhesion enhancer.

* * * * *